Figure 1:
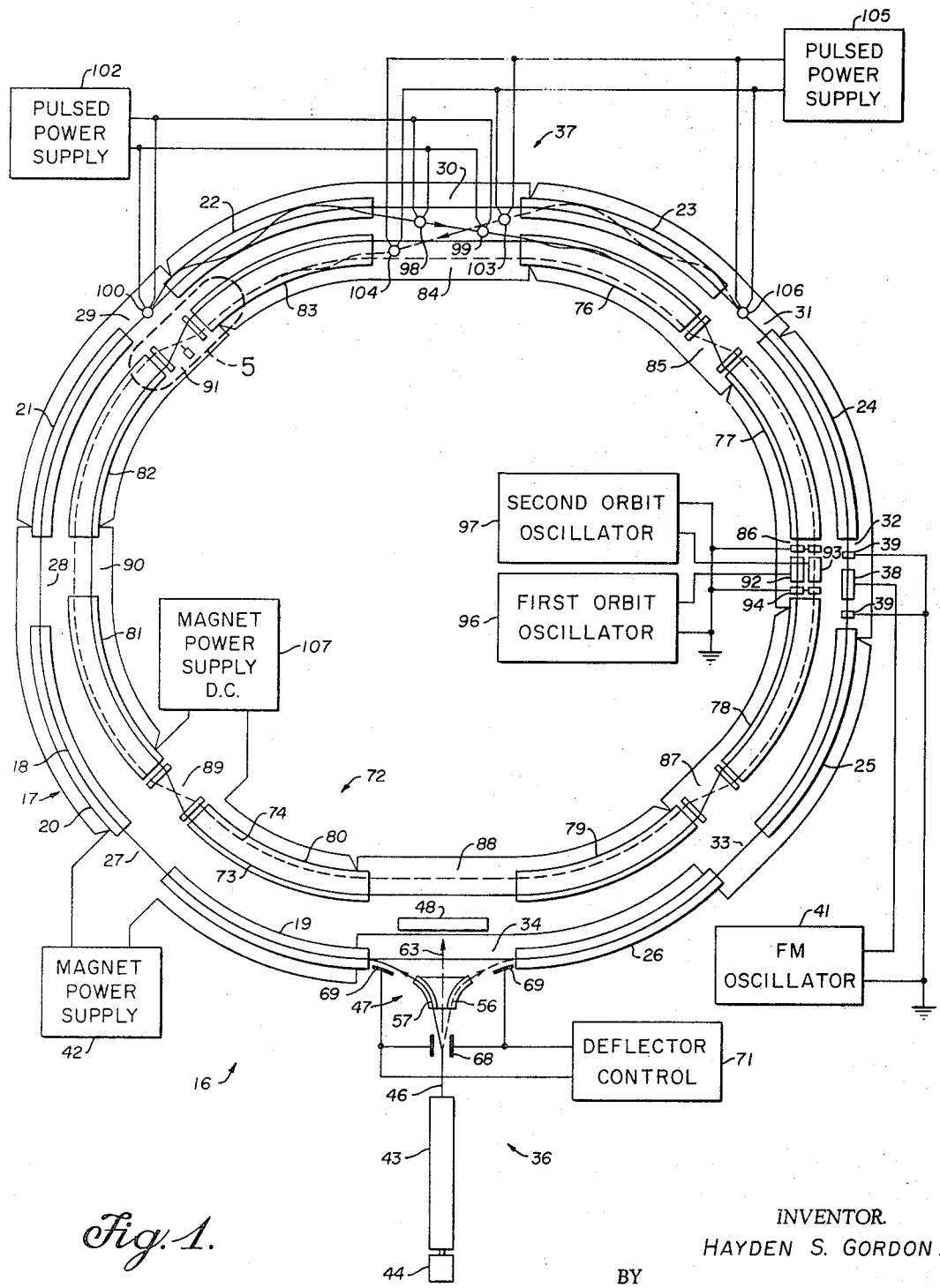

Sept. 19, 1967  H. S. GORDON  3,343,020
APPARATUS FOR THE ACCELERATION, STORAGE AND
UTILIZATION OF COUNTER-ROTATING
CHARGED PARTICLE BEAMS
Filed Oct. 8, 1964  4 Sheets-Sheet 1

INVENTOR.
HAYDEN S. GORDON.
BY
Robert A. Anderson
ATTORNEY.

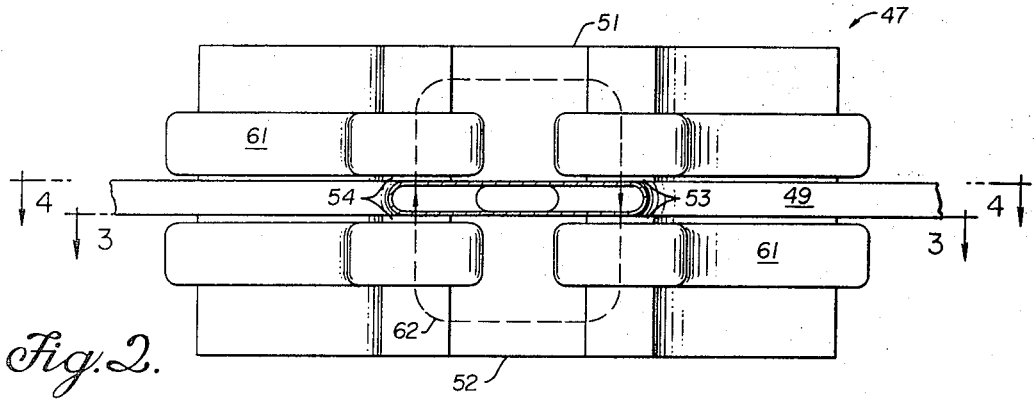
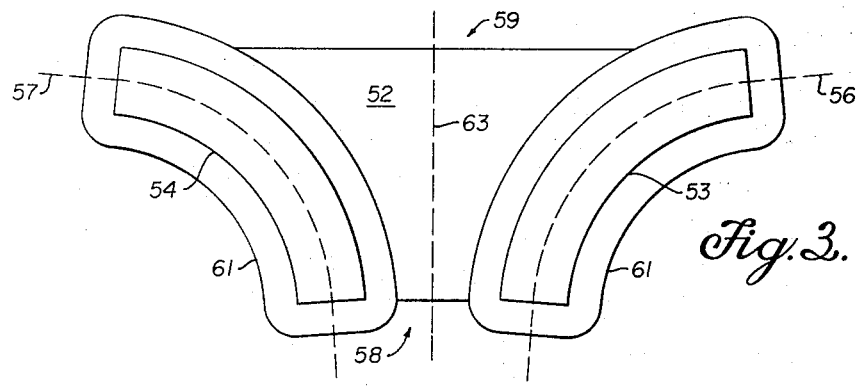
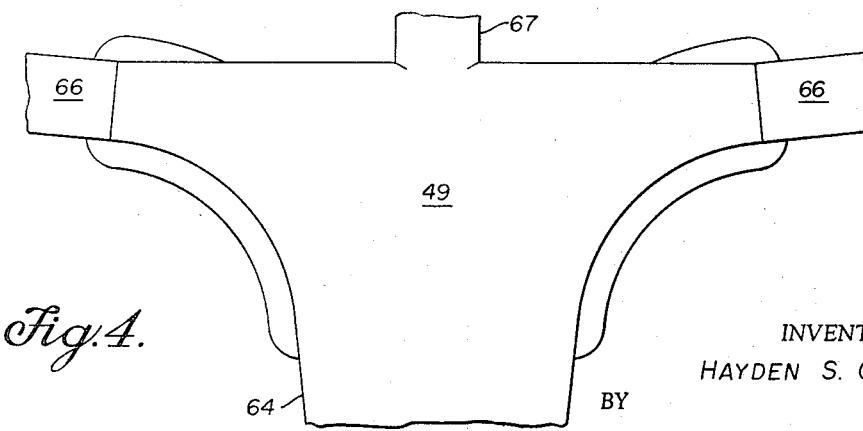
INVENTOR.
HAYDEN S. GORDON
BY
ATTORNEY.

Sept. 19, 1967  H. S. GORDON  3,343,020
APPARATUS FOR THE ACCELERATION, STORAGE AND
UTILIZATION OF COUNTER-ROTATING
CHARGED PARTICLE BEAMS
Filed Oct. 8, 1964  4 Sheets-Sheet 3

INVENTOR.
HAYDEN S. GORDON
BY
ATTORNEY.

INVENTOR.
HAYDEN S. GORDON
BY
*Roland G. Anderson*
ATTORNEY.

United States Patent Office 3,343,020
Patented Sept. 19, 1967

3,343,020
APPARATUS FOR THE ACCELERATION, STORAGE AND UTILIZATION OF COUNTER-ROTATING CHARGED PARTICLE BEAMS
Hayden S. Gordon, Orinda, Calif., assignor to the United States of America as represented by the United States Atomic Energy Commission
Filed Oct. 8, 1964, Ser. No. 402,664
18 Claims. (Cl. 313—62)

This invention relates to the acceleration and use of charged particles and more particularly to a proton synchrotron and associated apparatus for efficiently producing and utilizing charged particle beams having energies ranging up into the multi-hundred billion electron volt level. The invention described herein was made in the course of, or under, Contract W-7405-eng-48 with the United States Atomic Energy Commission.

At the present stage of high energy physics research, a need exists for a charged particle accelerator capable of generating beams with substantially higher energies than have heretofore been produced. For this purpose, a 200 BEV accelerator is currently being designed at the University of California. The highest beam energy heretofore achieved is believed to be approximately 32 BEV.

While in theory existing accelerator designs may be scaled up to produce the desired beam energy, numerous technical and economic problems are encountered in practice. A basic complication results from the nature of the massive annular magnet structure which is employed in such accelerators to hold the beam in a substantially circular orbit. Owing to saturation effects and other factors, the magnetic field strength at the particle orbit cannot be greatly increased relative to existing accelerators. Thus in order to provide for higher beam energies, the magnet must be expanded in overall diameter. For energies around 200 BEV, magnet diameters approaching one mile or more are required.

An accelerator having a magnet of this size requires, in addition to a large site area, very costly amounts of magnet iron, copper coil conductor and other materials. Further, the RF system, vacuum system, magnet alignment mechanism, shielding and maintenance systems must all be large or complex. The net result is that the accelerator is proportionately much more costly than existing installations.

Accordingly, it is highly desirable that a novel design be employed which will minimize construction costs to the extent possible and which will provide optimum usefulness for research operations.

With respect to the first objective, that of minimizing costs, co-pending application Ser. No. 339,043, now Patent No. 3,263,136, filed Jan. 20, 1964 by the present inventor and entitled High Energy Accelerator Magnet Structure, now U.S. Patent No. 3,263,136, issued on July 26, 1966, discloses means for minimizing the magnet diameter and materials in such an accelerator. The present invention provides further techniques for minimizing costs while accomplishing the second objective, that of optimizing the utility of the accelerator for research purposes. The invention achieves this result by means of novel structure for more efficiently and flexibly performing each of the primary operations required for ion acceleration.

In particular, the invention includes a primary accelerator of the proton synchrotron type in which ion beams are accelerated in opposite directions, around the same orbit, during alternate half cycles of the magnet excitation. Ion injection into the primary accelerator is effected by means of a single smaller accelerator which delivers an ion beam to a bi-directional deflector magnet situated near the particle orbit of the primary accelerator. The deflector magnet has a pair of beam passages which diverge and lead into the primary accelerator beam orbit in opposite directions. The deflector magnet has a third field free passage that leads to a low energy target so that the output of the smaller accelerator may be directly used for research purposes during the periods of each magnet cycle at which the primary accelerator cannot accept injected ions. Means systematically switch the output beam of the smaller accelerator into the three passages of the deflector magnet, in synchronism with the magnet cycles of the primary accelerator, so that maximum use is made of the smaller injector accelerator output.

To store the oppositely rotating beams which are generated by the primary accelerator during each cycle of the magnet excitation thereof, a storage ring is employed. The storage ring is an annular magnet structure disposed tangentially with respect to a straight section in the primary accelerator beam orbit and forming a pair of closed curvilinear concentric beam orbits which intersect at an even number of points so that the two orbits effectively have equal lengths. The oppositely rotating beams from the primary accelerator are transferred to separate ones of the two orbits of the storage ring which may accumulate the high energy ions from many cycles of the primary accelerator to form very intense contra-rotating beams.

The storage ring magnet structure has a unique cross-sectional configuration which provides for a maximized magnet field at the two particle orbits while requiring a minimized amount of iron and other magnet materials, the field having an alternating gradient at successive portions of the orbits to provide for beam focussing. In particular, the storage ring magnet includes a core having a broad central longitudinal passage through which the two beam orbits extend. The magnet excitation coil is disposed within the central passage of the core along the sides of both beam orbits and therebetween and is shaped to directly influence the configuration of the magnetic fields within the regions or the orbits. By utilizing the coil in this manner, field strength at the ion orbit is increased and the usable portion of the magnet field gap is broadened while the amount of iron in the storage ring core is minimized, the adaptation of this technique to the primary accelerator magnet being disclosed and claimed in the hereinbefore identified co-pending application Ser. No. 339,043, now Patent No. 3,263,136.

To produce the nuclear interactions which are to be studied, suitable targets may be interposed into either or both of the two contra-rotating beams in the storage ring or the beams may be extracted, by techniques known to the art, for bombardment of external targets. However a major advantage is obtained in many instances by colliding the two contra-rotating beams at one or more locations around the storage ring. As is known in the art, the effective interaction energy of two colliding oppositely directed particles is much greater than the sum of the energies of the two particles with respect to a stationary target.

Accordingly it is an object of this invention to provide apparatus for efficiently generating charged particle beams in the multi-hundred billion electron volt range.

It is an object of the invention to provide an extremely high energy charged particle accelerator which is readily adaptable to a variety of research operations.

It is a further object of the invention to minimize the size and costs of a high energy colliding beam charged particle accelerator.

It is a further object of the invention to provide for the sequential acceleration of oppositely directed ion beams within a single field gap of a proton synchrotron.

It is a further object of this invention to provide a single means for injecting ions into a charged particle accelerator in opposed directions whereby oppositely directed beams may be accelerated therein.

It is a further object of the invention to provide for the more complete utilization of the output beam of a pre-accelerator used for injecting ions into a proton synchrotron where the pre-accelerator has a greater duty cycle than the synchrotron.

It is a further object of the invention to provide a unitary beam storage ring for two contra-rotating particle beams.

It is a further object of the invention to minimize the cost and size of annular magnet structure for storing high energy oppositely rotating charged particle beams by providing for greater magnetic field strength, broader usable beam apertures and a reduction in the bulk and diameter of the magnet.

Figure 5:
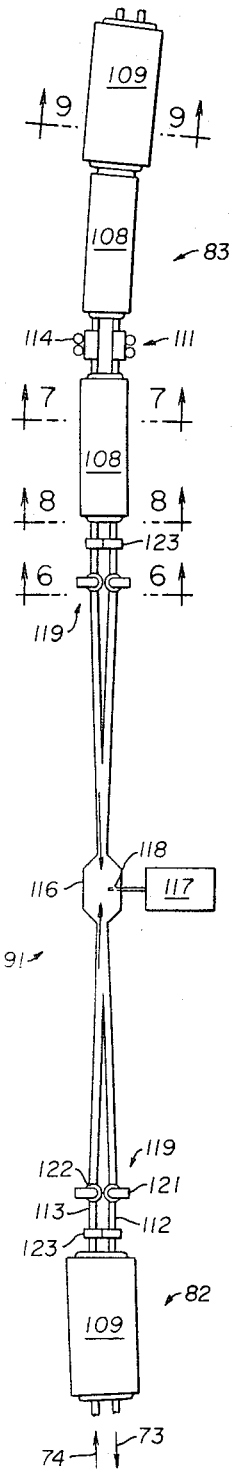

The invention, together with further objects and advantages thereof, will be better understood by reference to the following specification, together with the accompanying drawings of which:

FIG. 1 is a schematic plan view of an alternating gradient synchrotron, a beam injection system therefor, and a contra-rotating beam storage ring and other appurtenances in accordance with the invention, FIGURE 2 is an elevation view of beam deflecting magnet structure for bi-directionally injecting charged particles into an alternating gradient synchrotron as shown in FIGURE 1, FIGURE 3 is a plan section view of the beam deflecting magnet structure of FIGURE 2 taken along line 3—3 thereof, FIGURE 4 is a second plan section view of the beam deflecting magnet structure of FIGURE 2 taken along the more elevated line 4—4 thereof, FIGURE 5 is an enlarged and more detailed view of the portion of the apparatus of FIGURE 1 enclosed by dashed line 5 thereon and showing the structure of a portion of the storage ring for contra-rotating intersecting charged particle beams.

Figure 7:
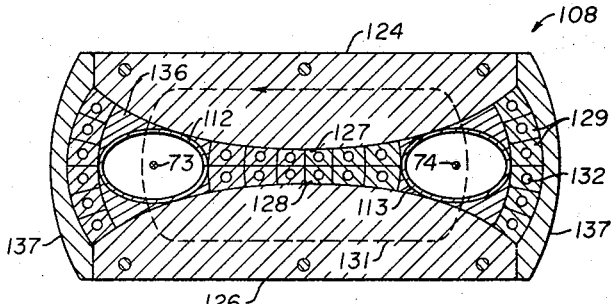
Figure 9:
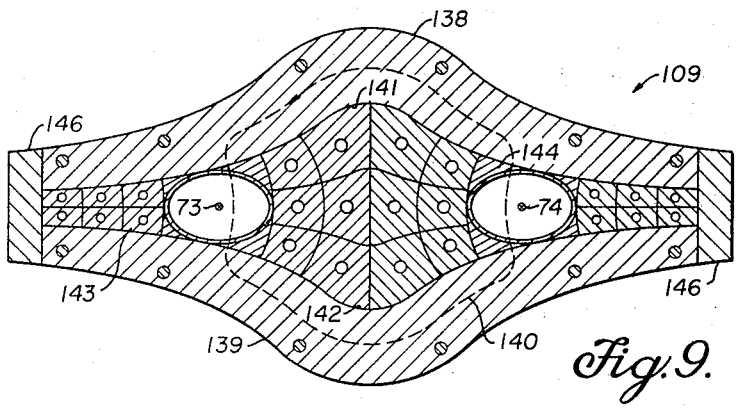
Figure 8:
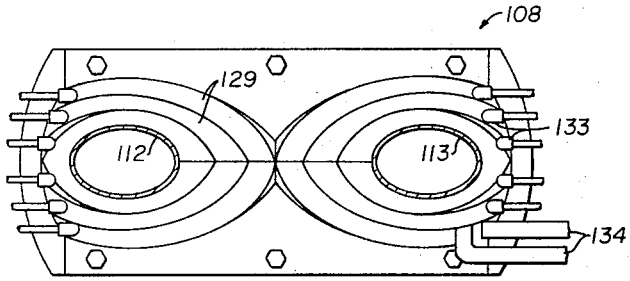
Figure 6:
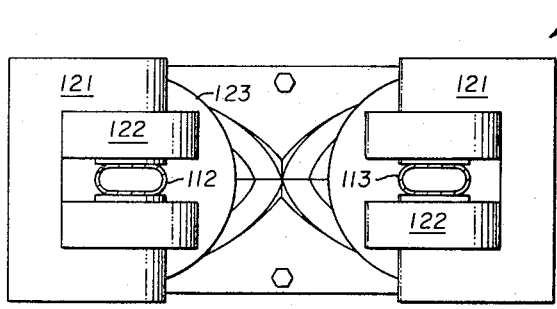
Figure 10:
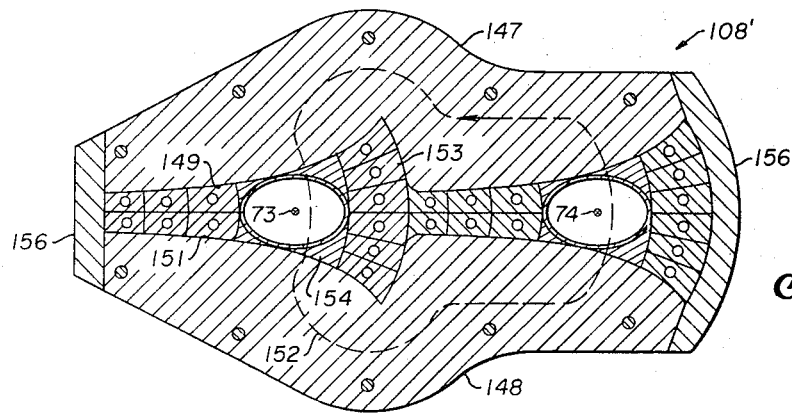
Figure 11:
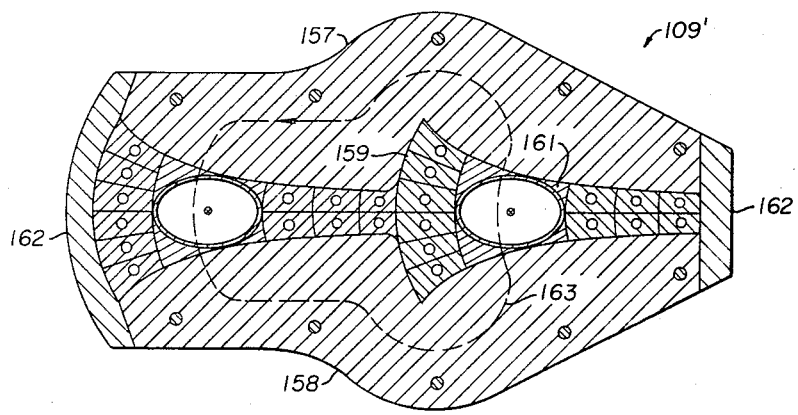

FIGURE 6 is an elevation view taken along line 6—6 of FIGURE 5 further illustrating certain elements of the storage ring, FIGURE 7 is a cross-section view taken along line 7—7 of FIGURE 5 showing the configuration of a first group of magnet sections of the storage ring, FIGURE 8 is a cross-section view taken along line 8—8 of FIGURE 5 showing a suitable electrical winding arrangement at one end of a representative magnet section of the storage ring, FIGURE 9 is a cross-section view taken along line 9—9 of FIGURE 5 showing the configuration of a second group of magnet sections of the storage ring, FIGURE 10 is a cross-section view illustrating an alternate configuration for the first group of magnet sections of the storage ring, and FIGURE 11 is a cross-section view illustrating an alternate configuration for the second group of magnet sections of the storage ring.

Referring now to the drawing and more particularly to FIGURE 1 thereof there is shown, schematically, an alternating gradient proton synchrotron 16 which may typically be designed to accelerate protons to energies of the order of 200 BEV and which may have a diameter of the order of one mile. The structure of synchrotron 16 may be essentially similar to that described in co-pending application Ser. No. 339,043 hereinbefore identified.

Synchrotron 16 includes an annular magnet assembly 17 of the type which establishes a closed charged particle orbit 18. To provide relatively unobstructed space for such operations as ion injection, acceleration and beam extraction, magnet assembly 17 is divided into a plurality of sectors which are spaced apart to provide a series of straight sections in the orbit 18. In the present embodiment of the invention eight major magnet sectors 19 to 26 are provided, each subtending forty five degrees of the curvature of orbit 18, with each adjacent pair of magnet sectors being spaced apart to define orbit straight section 27 to 34 respectively.

Further major elements of the synchrotron 16 include a bi-directional ion injection system 36 at orbit straight section 34 and a beam extraction system 37 at straight section 30, both of which will be hereinafter described in more detail. The ion accelerating means, of which a representative unit is shown disposed at orbit straight section 32, includes a cylindrical accelerating electrode 38 disposed coaxially with respect to the orbit 18 and a pair of annular ground electrodes 39 which are coaxial with the accelerating electrode with one being spaced a small distance from each end thereof. A frequency modulated oscillator 41 is connected between the accelerating electrode 38 and ground electrodes 39 to provide a periodically reversing electrical field therebetween so that ions are accelarated while passing through the gap between the accelerating electrode and each ground electrode.

If desired, the described accelerating structure may be duplicated at spaced positions around the orbit 18 provided that suitable phase relationships are maintained between the several accelerating stations.

The windings of the several magnet sectors 19 to 26 are connected in series with a high current power supply 42 which, for the purposes of the present invention, is of a type providing a programmed current that periodically reverses direction so that magnetic field which defines orbit 18 reverses polarity following each half cycle of the energizing current. Thus the synchrotron 16 may accelerate oppositely directed pulses of similarly charged ions during alternate half cycles of the magnet excitation current. The relationship between the magnet current waveshape, orbit radius, the accelerating electrode voltage frequency and amplitude and the charge to mass ratio of the ions necessary to accelerate particles may follow the conventional practice as known to those skilled in the art. Similarly the magnet pole configurations required for establishing an alternating gradient magnetic field around orbit 18 may be according to known principles.

Ions which are to be accelerated by a large synchrotron of this type must be injected with a substantial initial energy, typically around 2 BEV for a large synchrotron of the above indicated output energy. Accordingly the ion injection system 36 includes a linear accelerator 43 in addition to an ion source 44. Alternately the linear accelerator 43 may be replaced with a cyclotron or smaller proton synchrotron. Linear accelerator 43 is disposed perpendicularly with respect to orbit straight section 34 to direct a beam 46 of pre-accelerated ions towards a beam switching magnet 47 disposed adjacent the orbit.

Beam switching magnet 47 functions to direct the output of linear accelerator 43 tangentially into synchrotron orbit 18, the direction of ion injection being reversed for each succeeding half cycle of magnetic excitation. As ion injection into the synchrotron 16 must be confined to a small period during the initial portion of each such half cycle of magnet current, and the half cycle may typically be several seconds in duration, the switching magnet 47 also functions to deliver the linear accelerator output directly to a suitable low energy target or experimental area 48 during the remaining portions of the synchrotron magnet cycle so that optimum usage of the linear accelerator output may be made.

Referring now to FIGURES 2, 3 and 4 in conjunction, principal elements of switching magnet 47 include a non-magnetic vacuum envelope 49 extending between flat parallel ferromagnetic upper and lower magnet yoke members 51 and 52. The opposite sides of yoke members 51 and 52 project a small distance toward envelope 49 to form two pairs 53 and 54 of spaced apart elongated magnet poles which are oppositely curved in accordance with the desired two oppositely directed trajectories 56 and 57 for guiding ions into the synchrotron. Such trajectories 56 and 57, and therefore the two sets of poles 53 and 54, are relatively close at the forward end 58 of the switching magnet 47 and diverge, along slightly less than ninety degrees of arc, toward the rearward end 59 thereof.

Each of the two component poles in each set 53 and 54 thereof has an excitation winding 61 thereon which is connected to a suitable source of direct current. The windings 61 of each of the two sets of poles 53 and 54 are energized with oppositely directed currents so that the magnetic flux is oppositely directed at the two ion trajectories 56 and 57 as indicated by dashed line 62 in FIGURE 2.

The vacuum envelope 49 is shaped in conformity with the gap between poles 53 and 54 and yoke members 51 and 52 to provide a passage for ions along the alternate trajectories 56 and 57 as well as along a field free straight path 63 midway therebetween. At the forward end 58 of the switching magnet, envelope 49 has a broad entrance tubulation 64 and at the opposite end 59 the envelope connects with a pair of oppositely directed evacuated beam tubes 66 aligned with the ion trajectories 56 and 57 and leading to the synchrotron beam orbit. A third evacuated beam tube 67 connects with the rearward end of the vacuum envelope 49 and is aligned with the straight path 63 for transmitting ions from the linear accelerator 43 to the experimental area 48 as shown in FIGURE 1.

Referring now again to FIGURE 1, further components of the ion injection system 36 are shown for switching the pre-accelerated ions from linear accelerator 43 between the oppositely directed trajectories 56 and 57 and the straight path 63 of the switching magnet 47 and for guiding such ions into the synchrotron orbit 18. Such components include a first pair of deflector electrodes 68 disposed one on each side of the pre-accelerated ion beam 46 between the linear accelerator 43 and switching magnet 47. A second pair of deflector electrodes 69 are provided to turn the ions into exact coincidence with the synchrotron orbit 18 one such electrode being disposed adjacent the ion trajectory 57 at its juncture with orbit 18 and the other being similarly placed adjacent trajectory 56. The electrodes 68 and 69 on a first side of the ion beam 46 are connected to a first terminal of a control circuit 71 and the electrodes 68 and 69 on the opposite side of the beam are connected to the second terminal of the control circuit which is of a type that applies a high negative voltage pulse to the deflectors on one side of the beam 46 to deflect the beam into trajectory 57 and alternately applies a similar pulse to the deflectors on the opposite side of the beam to direct ions along trajectory 56. Such pulses have a duration corresponding to the brief injection periods of the synchrotron magnet cycle and one pulse occurs during each half cycle thereof so that the ion beam 46 is injected into synchrotron orbit 18 in opposed directions during alternate half cycles of magnet excitation and is transmitted along straight path 63 to experimental area 48 for a relatively long period during each such half cycle.

Referring now again to FIGURE 1, ions which have been accelerated to high energy by synchrotron 16 are transferred to a storage ring magnet 72 which provides two spaced apart, concentric and periodically intersecting orbits 73 and 74 for oppositely rotating particle beams.

Storage ring 72, like the synchrotron magnet 17, is formed in sectors which are spaced apart to provide field free regions at intervals around the two orbits 73 and 74. In the present instance the storage ring has eight such sectors 76 to 83 each subtending forty-five degrees of the curvature of the orbits 73 and 74 with each successive pair spaced apart to form field free sections 84 to 91 respectively. Inasmuch as the synchrotron magnet 17 will generally be operated close to saturation to obtain the maximum final beam energy for a given magnet diameter and as the storage ring magnet 72 must contain the same high energy ions, the storage ring must have an effective diameter approaching that of the synchrotron. If it is desired to dispose the storage ring 72 within the synchrotron 16 to conserve space as in the embodiment shown in FIGURE 1, one or more pairs of the field free sections of the storage ring may be shortened relative to the straight sections around the synchrotron orbit. Alternately, the storage ring 72 may encircle the synchrotron 16 or be disposed tangent thereto. In any of these arrangements it is desirable that a long field free section 84 of the storage ring 72 be adjacent the straight section 30 at which the beam extraction system 37 is situated.

To compensate for any energy loss which ions undergo in circulating around the storage ring orbits 73 and 74, and to provide a means for bunching the beam, a pair of cylindrical drift tubes 92 and 93 are disposed at field free section 86 each being coaxial with a separate one of the orbits and each having a pair of annular ground electrodes 94 spaced apart from each end thereof to form accelerating gaps. First and second oscillators 96 and 97, are connected to drift tubes 92 and 93 respectively, the oscillators being independently controlled so that the ions circulating within the two orbits may be bunched if desired and the phase relationship between the two contra-rotating beams may be adjusted to concentrate ion collisions at a selected one of the orbit intersection points. Without the action of the oscillators 96 and 97, ions will become fairly uniformly distributed around the two orbits 73 and 74 and some interactions between ions will occur at each intersection.

In order to transfer the high energy ions from the synchrotron 16 to storage ring 72, the beam extraction system 37 includes a first pulsed deflector magnet 98 positioned adjacent the synchrotron beam orbit 18 where the fully accelerated ions emerge from magnet sector 22 into straight section 30, the magnet being displaced slightly from the beam orbit on the inner side thereof. A second deflector magnet 99 is situated at the opposite end of the straight section 30 adjacent storage ring orbit 73 where the orbit enters storage ring magnet 76, the magnet being on the outside of the orbit. Deflector magnets 98 and 99 are each connected to a pulsed high power supply 102 which applies a current pulse to the magnets at the completion of a synchrotron acceleration cycle to deflect high energy ions from synchrotron orbit 18 into storage ring orbit 73.

As the deflector magnet 98 is displaced slightly from the synchrotron orbit 18 so that it will not disrupt the ion beam during the acceleration period, it is necessary to provide means for bringing such ions into the influence of the deflector magnet when beam extraction is to take place. This may be accomplished by perturbing the beam at one or more appropriate points on the orbit 18 to induce a systematic oscillation of the ion beam about the theoretical orbit centerline. In the embodiment of FIGURE 1 this is effected by an additional pulsed deflector magnet 100 situated at orbit 18 in straight section 29 and coupled to the power supply 102. In accordance with principles known to the art, the momentary lateral force exerted on the beam by magnet 100 causes the ions to oscillate radially about the orbit centerline and thus the beam may be caused to deviate therefrom into the field of the subsequent deflector magnet 98.

The final deflector magnet 99 is also displaced from the storage ring orbit 73 so that the deflected ions are only approximately turned into coincidence with the orbit. Within limits, the focussing properties of the storage ring magnetic field will gradually bring such ions into the optimum orbit. This arrangement is desirable to prevent the field of deflector magnet 99 from significantly influencing ions which are already circulating around the storage ring orbit 73.

A second pair of deflector magnets 103 and 104 are similarly situated in synchrotron orbit straight section 30 opposite to magnets 98 and 99 respectively and are pulsed on by a second power supply 105 to deflect the alternate contra-rotating high energy ions from the synchrotron orbit 18 to the second storage ring orbit 74. An additional deflector magnet 106 is situated on synchrotron orbit 18 at straight section 31, and coupled to pulsed power supply 105, to induce the radial oscillation needed to direct the ions into the field of magnet 103.

Inasmuch as the ions circulating within the storage ring 72 do not receive any significant degree of further acceleration, the storage ring magnetic field may be held constant. Accordingly the several magnet sectors 76 to 83 are connected in series with a suitable direct current power supply 107.

Considering now the more detailed structure of the storage ring magnet assembly 72, FIGURE 5 illustrates terminal portions of magnet sectors 82 and 83 together with the intervening long field free section 91. Each of the principal magnet sectors is comprised of a series of individual magnet sections 108 and 109 of which there are two different types to provide the periodic reversal of field gradient around the orbits 73 and 74 which is required for alternating gradient focussing.

As is understood within the art, and discussed in detail by E. D. Courant et al., The Physical Review 88, 1190 (1952), strong axial and radial focussing forces are experienced by a charged particle beam circulating around an orbit at which the field gradient, measured along radii of the orbit, is alternately positive and negative at successive portions of the orbit. In the embodiment of the invention shown in FIGURE 5 magnet sections 108 provide a field which decreases with radius in the region of the outermost of the two orbits 73 and 74 and which increases with radius in the region of the innermost of the two orbits. Magnet sections 109 have a reversed field gradient along radii of each of the two orbits. Within each of the eight major storage ring sectors 76 to 83, the magnet sections are disposed in a repeated sequence in which a pair of sections 108 are separated by a short field free space 111 and immediately followed by a pair of sections 109 which are also separated by a short space 111. Each such sector may typically include seventy-two individual magnet sections 108 and 109 so that the complete storage ring 72 may have 576 separate magnet sections.

The two orbits 73 and 74, which pass longitudinally through the magnet sections 108 and 109, are each enclosed in a separate vacuum tubulation 112 and 113 respectively, vacuum pumps 114 being coupled to each such tubulation at the field free sections 111 between adjacent magnet sections. The orbits 73 and 74 intersect within the long field free section 91 shown in FIGURE 5 and accordingly, the vacuum tubulations 112 and 113 converge at the center of the straight section 91 into a single enlarged vacuum housing 116 which may have particle detection equipment 117 thereat for studying the interactions between the colliding beams and which may have facilities for introducing a target 118 into the beams.

In addition to providing for collision of the contra-rotating beams, the crossing of the two particle orbits 73 and 74 at a plurality of points around the storage ring 72 allows the effective length of the two orbits to be equalized. For this purpose an even number of such intersection points must be provided, a total of four being present in this embodiment.

Referring now to FIGURE 6 in conjunction with FIGURE 5, crossing of the particle beams at the desired points is brought about by means of bending magnets 119 of which a pair are disposed at each end of the field free section 91 to provide localized magnetic fields normal to each of the orbits 73 and 74. Each such magnet 119 includes a C-shaped yoke 121 positioned so that the associated vacuum tubulation 112 or 113 extends through the gap thereof and each has a pair of excitation windings 122 encircling the poles which define the gap.

Multi-pole magnetic focussing lenses 123 may be disposed at intervals around the beam orbits 73 and 74, one being located, for example, on each orbit between the terminal magnet section 108 of sector 83 and another pair being situated in similar positions adjacent the terminal magnet section of sector 82. Similar lenses are disposed in the field free sections of the orbits around the remaining portions of the storage ring to compensate for the defocussing effects of the field free sections as well as the similar effects which may result from slight inaccuracies in the shape and alignment of the magnet sections 108 and 109. The structure and principle of operation of such lenses 123 are known to the art and are described, for example, in the hereinbefore identified Physical Review reference.

Referring now to FIGURES 7 and 8, the magnet sections 108 and 109 have a unique design which provides for a higher field strength at the particle orbits than has heretofore been characteristic of alternating gradient accelerator magnets. In addition the design allows a proportionately greater width of the field gap to be used for beam transmission and markedly reduces the amount of magnet iron and electrical conductor required for the magnet. This is accomplished essentially by locating the excitation windings of the magnet adjacent the beam orbits and shaping the windings to force the magnetic field in the region of the orbits into an optimum configuration across substantially the entire magnet gap. In a conventional alternating gradient accelerator magnet, having coils remote from the field gap, the field configuration is determined almost wholly by the shape of the pole faces and cannot be held to a preferred configuration except in a relatively small region immediately around the theoretical centerline of the orbit.

As heretofore discussed, two forms of magnet section 108 and 109 are used in the storage ring to provide the required alternating magnetic gradient at each orbit. Referring now to FIGURE 7 in particular, the first magnet section type 108 has a configuration in which the field decreases with radius in the region of the outermost orbit 73 and increases with radius in the region of the innermost orbit 74. Magnet section 108 includes upper and lower pole pieces 124 and 126 respectively between which the spaced orbit vacuum envelopes 112 and 113 extend. The pole pieces 124 and 126 have convex pole faces 127 and 128 respectively, the curvature being symmetrical about a vertical center plane through the magnet section and being hyperbolic to provide the desired field gradient at each orbit 73 and 74.

Methods for computing the optimum pole face curvature to provide alternating gradient focussing are known to the art, such methods being applicable to the present invention. The invention differs from prior magnets in that a substantially stronger field intensity at the orbits may be used as a basis for such computation and the usable field configuration may be extended across a broader portion of the gap between the pole faces. This is possible for reasons which may be understood by considering the factors that limit the field in an alternating gradient magnet. Specifically, owing to the hyperbolic curvature, the pole faces in an alternating gradient magnet are necessarily much closer at one side of the orbit region than at the other. Thus as the overall field strength is raised the magnet iron saturates first in a region well to one side of the orbit rather than at the orbit itself, and a further field increase is not practical. Relative to the present invention, the differential between maximum field obtainable at the particle orbit and the stronger field to one side thereof has been undesirably large. This has unduly limited the field strength at the orbit, requiring larger diameter machines for a given energy, and has restricted the size of the beam aperture inasmuch as the gradient rapidly becomes unacceptable to either side of the theoretical orbit centerline.

The present invention allows the field intensity in the orbit region to more closely approach that of the maximum field to one side thereof and provides for an acceptable field configuration across a broader portion of the magnet gap. As noted, this is accomplished by disposing the magnet excitation windings directly within the field gap between the pole pieces 124 and 126 and shaping the windings to force the magnetic field into a preferred configuration in which some of the magnetic flux from the maximum field region is forced towards the orbit region.

In particular, the magnet coil is comprised of a series of turns of copper conductor 129 forming a continuous winding and is disposed in the magnet gap immediately outside the vacuum envelopes 112 and 113 and in the space therebetween. A first plurality of turns, six in this instance, encircle the region through which vacuum envelope 112 passes and an equal number of turns encircle the region of vacuum envelope 113 in a reversed direction so that, when current is passed through the conductor, oppositely directed magnetic flux transects each orbit 73 and 74. Thus, as indicated by dashed line 131 in FIGURE 7, a closed flux path is provided which is directed generally downward within vacuum envelope 112, extends horizontally within lower pole piece 126, turns upwardly through vacuum envelope 113 and returns in a generally horizontal direction through the upper pole piece 124.

Conductor 129 is of varying cross-sectional shape and fills all portions of the gap between pole faces 128 and 127 except those occupied by vacuum envelopes 112 and 113 and the magnetic flux which passes therethrough. In cross-section the conductor 129 is four-sided with the more vertical sides of each conductor section curved to lie along the magnetic flux lines of the desired field configuration and with the more horizontal sides curved to lie along magnetic equipotential lines of the desired field. The relative cross-sectional areas of each section of the conductor 129 are fixed in proportion to the desired field intensity of the location of the particular section.

As a result of the above described design and disposition of the winding conductor 129, the field within the regions occupied by the winding itself is forced to conform very closely to the desired configuration. As these regions are close to the orbits 73 and 74, the fields at the latter are also forced to approximate the preferred configuration.

Referring now to FIGURE 8 in conjunction with FIGURE 7, the conductor 129 passes above and below the vacuum envelopes 112 and 113 at the ends of the magnet section 108 to form the described series of turns. To provide for cooling the winding, conductor 129 has an internal longitudinal passage 132 and fittings 133 are mounted on the conductor at the ends of the magnet section to provide for the circulation of coolant through the passage. One turn of the conductor 129 is discontinuous at the end of the magnet section 108 forming terminals 134 for connecting direct current to the winding.

Referring now again to FIGURE 7 in particular, further components of the magnet section 108 include spacing element 136 formed of a non-magnetic material such as ceramic and shaped to fill the void spaces between vacuum tubulations 112 and 113, pole faces 127 and 128 and the winding 129. Arcuate non-magnetic side members 137 extend between the upper and lower pole pieces 124 and 126 and have a concave inner surface which bears against the outer surfaces of the winding 129. Thus by clamping the side members to the pole pieces 124 and 126, the components of the magnet section are secured together with a wedging action that promotes strength and rigidity.

Referring now to FIGURE 9, the alternate magnet sections 109 have a differing cross-sectional configuration to provide a reversed field gradient at each of the orbits 73 and 74. Spaced upper and lower pole pieces 138 and 139 have pole faces 141 and 142 respectively defining a gap which is narrowest at the sides of the magnet section 109 and which reaches maximum depth at the center midway between the orbits 73 and 74. The hyperbolic curvature by which the pole faces 141 and 142 converge from the center towards the sides is similar to that of the previously described magnet section 108 but reversed in direction. Similarly the magnetic field curvature in the orbit regions is reversed as indicated by dashed line 140. A hollow conductor 143 forms a continuous winding which is disposed in the gap between pole faces 141 and 142 in accordance with the conditions hereinbefore specified for the first magnet section 108. Thus the winding conductor 143 fills the gap between pole faces 141 and 142 except for the regions occupied by the vacuum envelope 112 and 113 and the regions transected by the magnet flux which passes through the vacuum envelopes. The conductor 143 is four-sided in cross-section with the more vertical sides curved to lie along magnetic flux lines of the desired field and with the more horizontal sides of the conductor curved to lie along magnetic equipotential lines. As in the previous instance, each portion of the winding conductor 143 has a cross-sectional area proportional to the desired field strength in the region occupied by such portion.

Magnet section 109 also includes non-magnetic spacer element 144 filling the regions between the oval vacuum envelopes 112 and 113, winding 143, and pole faces 141 and 142. Non-magnetic side members 146 extend between the upper and lower pole pieces 138 and 139 to secure the assembly together.

Referring now to FIGURES 10 and 11 there is shown a second suitable configuration for the two types of magnet section employed in the storage ring. In contrast to the previously described embodiment of FIGURES 7 to 9, the magnet sections 108' and 109' of FIGURES 10 and 11 provide similarly directed field gradients at each of the two orbits 73 and 74 in any given magnet section.

Referring now to FIGURE 10 in particular, the first magnet section type 108' includes upper and lower pole pieces 147 and 148 having pole faces 149 and 151 respectively. The pole faces 149 and 151 have the previously discussed hyperbolic curvature in the region of each of the orbits 73 and 74, the pole face configurations at each of the two orbits being similarly oriented in this instance. Thus the pole faces 149 and 151 are relatively close spaced at one side of the magnet section 108' and diverge towards the center thereof past a first of the orbits 73. The pole faces again closely approach one another near the center of the magnet section 108' and again diverge, past the second orbit 74, towards the second side of the magnet section. Thus as indicated by dashed line 152, the magnet flux at the two orbits 73 and 74 is similarly curved.

The winding conductor 153 of magnet section 108' is disposed within the gap between pole faces 149 and 151 under the conditions hereinbefore described. In particular, winding 153 is shaped to fill all of the gap except for the region occupied by vacuum envelopes 112 and 113 and by the magnetic flux 152 which passes through the vacuum envelopes. The more vertical curved sides of the conductor 153 lie along magnetic field lines of the desired field configuration and the more horizontal sides of the conductor follow along magnetic equipotential surfaces of the field, each section of the conductor having a cross-sectional area proportional to the field strength thereat. As in the previously described embodiment, non-magnetic spacer elements 154 are disposed in the regions of the gap which are not occupied by winding 153 or vacuum envelopes 112 and 113 and side members 156 extend between the pole pieces 147 and 148.

The alternate magnet section 109', shown in FIGURE 11, includes upper and lower pole pieces 157 and 158, winding conductor 159, spacers 161 and side members 162, each similar in construction and arrangement to the corresponding elements of the previously described magnet section 108' except that the assembly is reversed from side to side, as a unit, so that the field gradient at the orbits 73 and 74 is opposite to that of magnet section 108', as indicated by dashed line 163.

Considering now the operation of the invention as a unit, with reference again to FIGURE 1, ions from source 44 are pre-accelerated by linear accelerator 43 and directed towards beam switching magnet 47. In passing between deflector electrodes 68, the ions are periodically switched between the diverging trajectories 56 and 57 of the switching magnet, in synchronism with the synchroton magnet cycle, and thus are alternately injected into the synchroton in opposed directions. In the intervals between injection into the synchroton 16, the ions pass directly from linear accelerator 43 to low energy target 48 where any desired use of the beam may be made.

Ions injected into the synchroton 16 are accelerated thereby in the conventional manner during each half cycle of the magnet current, the acceleration being in opposite directions during alternate half cycles. When the ions which were originally injected into the synchroton 16 along trajectory 56 reach maximum energy, power supply 105 applies a pulse to extraction magnets 103, 104 and 106. The ions are thereby deflected into orbit 74 of the storage ring 72. Similarly, when ions originally injected into synchroton 16 along trajectory 57 reach maximum energy, power supply 102 applies a pulse to extraction magnets 98, 99 and 100 deflecting such ions into the alternate storage ring orbit 73.

Following injection into the two storage ring orbits 73 and 74 as described above, the ions circulate therearound in contra-rotating beams which may be relatively intense owing to the accumulation of ions from many cycles of synchroton operation. As hereinbefore discussed the accelerating electrodes 92 and 93 compensate for any energy loss of the contra-rotating ion beams and may be utilized for beam bunching and for adjusting the phasing of one ion beam relative to the other.

Thus the contra-rotating beams are caused to collide at one or more of the storage ring orbit intersection points, such as at straight section 19, and the resultant reactions may be studied by suitable detection equipment 117.

Several other methods for utilizing the high energy ions may be arranged. If desired, targets may be introduced directly into the ion beam within synchrotons 16 or into one or both of the contra-rotating beams of storage ring 72. Similarly, high energy ion beams may be extracted from the synchroton 16, using conventional techniques, for bombardment of an external target or such beams may be extracted from the storage ring 72. By using several of such methods, a variety of essentially independent bombardments may be performed concurrently.

While the invention has been disclosed with respect to a specific embodiment, it will be apparent that numerous modifications and variations are possible within the spirit and scope of the invention and thus it is not intended to limit the invention except as defined in the following claims.

What is claimed is:

1. In apparatus for accelerating charged particles to high energies, the combination comprising:
    (a) an annual magnet structure of the type defining a closed curvilinear charged particle orbit, said magnet having a core and excitation coils therefor,
    (b) a source of periodically reversing current coupled to said excitation coils whereby the magnetic field at said particle orbit is periodically reversed,
    (c) accelerating electrode means situated at said particle orbit and applying a cyclically varying electrical field along a portion thereof, and
    (d) means for injecting particles into said orbit for rotation therearound in a first direction while the field of said magnet has a first polarity and for rotation therearound in the opposite direction when said magnetic field has a second reversed polarity.

2. Apparatus for generating nuclear interactions at extremely high energies comprising, in combination:
    (a) an annular electromagnet forming a closed curvilinear charged particle orbit, said electromagnet having a core and excitation coil therefor and being divided into a plurality of spaced apart sectors whereby a plurality of straight sections are provided around said orbit,
    (b) a source of periodically reversing current coupled to said excitation coil of said electromagnet whereby the polarity of the field thereof is periodically reversed,
    (c) at least one accelerating electrode disposed at one of said straight sections of said particle orbit,
    (d) a source of high frequency alternating electrical potential coupled to said accelerating electrode whereby a periodically reversing electrical field is established along a portion of said orbit,
    (e) charged particle injection means disposed to direct pulses of particles into said orbit for rotation therearound, and
    (f) particle injection control means reversing the direction of injection of said particles into said orbit, said direction reversing means being synchronized with the reversals of polarity of said field of said electromagnet whereby oppositely directed particle beams are accelerated therein.

3. Apparatus for generating nuclear interactions as described in claim 2 and comprising the further combination of:
    (g) a high energy beam storage device coupled to said electromagnet for receiving and storing at least one of said contra-rotating particle beams, and
    (h) means for colliding said contra-rotating particle beams.

4. A high energy charged particle accelerator, comprising, in combination:
    (a) an annular electromagnet structure of the type forming a closed charged particle orbit, said electromagnet having a core and excitation windings therefor and being divided into a plurality of spaced apart sectors whereby a plurality of spaced apart straight sections are provided around said orbit,
    (b) a magnet power supply coupled to said windings and providing alternating current thereto whereby the polarity of the magnetic field at said orbit is cyclically varied and periodically reversed,
    (c) an accelerating electrode disposed at said orbit,
    (d) a source of frequency modulated alternating electrical potential coupled to said accelerating electrode,
    (e) a relatively low energy charged particle pre-accelerator disposed to direct an ion beam toward said orbit,
    (f) a bi-directional beam deflector disposed between said pre-accelerator and said orbit and having first and second beam channels for directing said ions into said orbit for rotation therearound in opposite directions, and
    (g) control means for said beam deflector for switching the beam from said pre-accelerator between said first and second beam channels in synchronism with said reversals of polarity of said magnetic field at said orbit.

5. A high energy charged particle accelerator as described in claim 4 wherein said bi-directional beam deflector (f) is provided with a third beam channel directly communicated with a beam utilization device whereby the output of said pre-accelerator may be separately utilized between injections of beam into said orbit.

6. A high energy charged particle accelerator as described in claim 4 wherein said bi-directional beam deflector (f) is comprised of a magnet structure having two sets of curved spaced apart pole faces defining said first and second beam channels and having oppositely directed magnetic flux, said sets of pole faces and the beam channels thereof having proximal beam input ends and relatively widely spaced oppositely facing beam output ends.

7. A high energy charged particle accelerator as described in claim 6 and comprising the further combination of a first deflector electrode disposed between said pre-accelerator and said bi-directional beam deflector, a second deflector electrode disposed between said output end of said first beam channel and said orbit, and a third deflector electrode disposed between the exit end of said second beam channel and said orbit, and wherein said control means (g) cyclically applies a pulsed electrical potential to each of said deflectors to switch said beam between said input ends of said first and second beam channels and to direct said beam from said output ends of said first and second beam channels into said orbit.

8. Apparatus for producing nuclear interactions at extremely high energies comprising, in combination:
(a) a first annular magnet structure of the class providing a first closed charged particle orbit, said magnet structure having a core and excitation windings therefor,
(b) a programmed current magnet power supply coupled to said windings whereby the magnetic field at said first orbit is periodically reversed,
(c) an accelerating electrode disposed at said first orbit,
(d) a source of alternating electrical potential coupled to said accelerating electrode whereby a cyclically reversing electrical field is established along a portion of said first orbit,
(e) means injecting charged particles into said first orbit in opposite directions therein during periods of opposite polarity of said magnetic field at said first orbit whereby contra-rotating particle beams are sequentially accelerated in said first orbit,
(f) a second annular magnet structure providing a second and a third charged particle orbit having oppositely directed magnetic fields thereacross,
(g) means transferring said contra-rotating particle beams from said first orbit to separate ones of said second and third orbits, and
(h) beam guiding means situated at said second and third orbits for colliding said contra-rotating beams thereof.

9. Apparatus for producing nuclear interactions as described in claim 8 wherein said second and third charged particle orbits of said second magnet structure intersect at an even number of points.

10. Apparatus for producing nuclear interactions as described in claim 8 wherein said second annular magnet structure (f) is divided into a plurality of spaced apart sectors whereby a plurality of straight sections are provided in said second and third particle orbits and comprising the further combination of at least a pair of accelerating electrodes one being disposed at each of said second and third orbits at one of said straight sections thereof, and a source of cyclically varying electrical potential coupled to said accelerating electrodes.

11. Apparatus for producing nuclear interactions at extremely high energies as described in claim 8 wherein a second and a third accelerating electrode are situated at said second and third charged particle orbits respectively and wherein said means (g) for transferring said contra-rotating beams from said first orbit to separate ones of said second and third orbits comprises at least one first beam deflector situated adjacent said first orbit, a second beam deflector situated adjacent said second orbit, a third beam deflector situated adjacent said third orbit, and control means pulsing said first and second beam deflectors to deflect a first of said contra-rotating beams from said first orbit into a path close to said second orbit and alternately pulsing said first and third beam deflectors to deflect the second of said contra-rotating beams from said first orbit into a path close to said third orbit, whereby the inherent focussing action of said accelerating electrodes brings said first and second contra-rotating beams into said second and third orbits.

12. Apparatus for producing nuclear interactions as described in claim 8 wherein said second magnet structure (f) is comprised of a plurality of sectors, each of said sectors having a core with a pair of spaced apart pole faces forming a field gap through which said second and third particle orbits extend and having excitation windings for said core which extend within said gap along each side of each of said second and third particle orbits, the surfaces of said windings which face said orbits being curved to lie along flux lines of a predetermined magnetic field configuration for said gap.

13. Apparatus for producing nuclear interactions at extremely high energies as described in claim 8 wherein said second magnet structure (f) is comprised of a first and a second set of magnet sections, magnet sections from said first and second sets being intermixed around the circumference of said second magnet structure in a predetermined recurring sequence, each of said first set of magnet sections comprising a core having spaced apart hyperbolic pole faces forming a field gap through which said second and third particle orbits pass and in which said pole faces diverge outwardly from the central region therebetween, each of said second set of magnet sections comprising a core having spaced apart hyperbolic pole faces forming a field gap through which said second and third particle orbits pass and in which said pole faces converge outwardly from the central region therebetween, and wherein each of said magnet sections has a winding which extends along both side regions of the field gap and along the center thereof between said second and third orbits, the surfaces of said windings which face said orbits being curved to lie along the flux lines of a predetermined field configuration for said gap.

14. Apparatus for producing nuclear interactions at extremely high energies as described in claim 8 wherein said second magnet structure (f) is comprised of a first and a second set of magnet sections which are intermixed around the circumference of said second magnet structure in a predetermined recurring sequence, each of said first set of magnet sections comprising a core with spaced apart pole faces which have a hyperbolic curvature in the region of said second orbit to provide a similarly directed field gradient thereat, each of said second set of magnet sections having spaced apart pole faces with a curvature similar to that of said pole faces of said first set but reversed to provide an oppositely directed field gradient at said second and third orbits, each of said magnet sections having a winding for said core which extends within said gap along each side of said second and third particle orbits and along the region between said second and third orbits, the surfaces of said winding which face said orbits being curved to follow flux lines of a predetermined magnetic field configuration within said gap.

15. A storage ring for receiving and colliding contra-rotating high energy charged particle beams comprising an annular magnet structure defining two closed spaced apart co-planar charged particle orbits, said magnet structure being divided into a plurality of spaced apart sectors whereby straight sections are provided in said orbits, said sectors of said magnet structure being further divided into a first and second set of magnet sections which are intermixed around said orbits in a recurring sequence, each of said magnet sections having spaced apart hyperbolically curved pole faces to provide a radial field gradient along said orbits, the pole face curvature of said first set of magnet sections being reversed relative to that of said second set of magnet sections to provide alternating gradient focussing along said orbits, each of said magnet sections further having excitation coils extending through said plane between said pole faces in the regions beside and between said spaced apart orbits, at least the portions of said coil which are adjacent said orbits being curved in conformity with a predetermined magnetic field configuration for the regions of said coil portion.

16. A storage ring for receiving and colliding contra-rotating high energy charged particle beams as described in claim 15 wherein beam deflection devices are disposed at said straight sections of said orbits at an even number of positions therearound for interchanging the radial position of said orbits an even number of times whereby the lengths of said orbits are made equal.

17. A storage ring for receiving and colliding contra-rotating high energy charged particle beams as described in claim 15 wherein each of said first set of magnet sections comprise a core having spaced apart hyperbolic pole faces forming a field gap through which said two spaced apart particle orbits pass and in which said pole faces diverge outwardly from the central region therebetween, and each of said second set of magnet sections comprise a core having spaced apart hyperbolic pole faces forming a field gap through which said orbits pass and in which said pole faces converge outwardly from the central region therebetween, the field being oppositely directed at said two orbits in each of said magnet sections.

18. A storage ring for receiving and colliding contra-rotating high energy charged particle beams as described in claim 15 wherein each of said first set of magnet sections comprises a core with spaced apart pole faces which have a convex hyperbolic curvature in the region of a first of said spaced apart orbits to provide a field gradient thereat and which have a repeated similar curvature in the region of the second of said orbits to provide a similar field gradient thereat, each of said second set of magnet sections comprising a core with spaced apart pole faces curved similarly to those of said first set of magnet sections but reversed to provide oppositely directed field gradients at said orbits.

References Cited

UNITED STATES PATENTS 2,979,635   4/1961   Burleigh _____ 313—62 X

JAMES W. LAWRENCE, *Primary Examiner.*

STANLEY D. SCHLOSSER, *Examiner.*